United States Patent Office 2,989,506
Patented June 20, 1961

2,989,506
CATALYTIC POLYMERIZATION
Donald E. Hudgin, Summit, and Frank M. Berardinelli, South Orange, N.J., assignors to Celanese Corporation of America, New York, N.Y., a corporation of Delaware
No Drawing. Filed Oct. 21, 1957, Ser. No. 691,143
16 Claims. (Cl. 260—67)

This invention relates to polymeric materials and more particularly to a method for producing a tough, high molecular weight material by the polymerization of trioxane.

Trioxane is a cyclic trimer of formaldehyde having a six-membered heterocyclic ring consisting of alternating oxygen atoms and methylene groups. Pure trioxane melts at 64° C. and boils without decomposition at approximately 115° C.

It is known that trioxane may be polymerized in the presence of certain specific inorganic fluorides, such as antimony trifluoride, to produce a tough high molecular weight polymer, known as polyoxymethylene, after a polymerization period ranging from one to seven days. The polymer is useful in the production of molded or extruded objects. It has been reported that the nature of the inorganic fluoride is quite critical and that many metallic fluorides, such as sodium fluoride, calcium fluoride, lead fluoride and ferric fluoride show no catalytic activity.

It is an object of this invention to provide a new process for making a tough, high molecular weight material from trioxane in which conversion takes place in seconds or minutes, rather than days. Other objects will appear hereinafter.

The objects of this invention are accomplished by a process which comprises polymerizing trioxane in the presence of a coordinate complex of boron fluoride with an organic compound in which an element of the group consisting of oxygen and sulfur is the donor atom, to produce polyoxymethylene.

Preferably, the polymerization takes place in molten trioxane at atmospheric pressure. However, the temperature of the reaction may vary from about —10° to about 180° C. and the trioxane may be in solid or vapor phase at the temperature extremes.

The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other boron fluoride complexes which may be used are the complexes with ethanol, with methanol, with propanol, with butanol, with methyl acetate, with ethyl acetate, with phenyl acetate, with benzoic acid, with acetic anhydride, with acetone, with methyl ethyl ketone, with dimethyl ether, with methyl phenyl ether, with acetaldehyde, with chloral, with dimethyl sulfide and with ethyl mercaptan.

The coordinate complex of boron fluoride should be present in the polymerization zone in amounts such that its boron fluoride content is between about .001 and about 1.0 weight percent based on the weight of trioxane in the polymerization zone. Preferably, amounts between about .003 and about 0.1 weight percent should be used.

The trioxane in the reaction zone is preferably anhydrous or substantially anhydrous. Small amounts of moisture, such as may be present in commercial grade trioxane or may be introduced by contact with atmospheric air will not prevent polymerization, but should be removed for best yields.

In one method of preparation, the trioxane is maintained as a molten body at a temperature between about 80 and 100° C. A measured amount of coordinate complex of boron fluoride, such as boron fluoride etherate may be added with vigorous stirring. The desired polymer is produced instantaneously.

If desired, a more even distribution of the catalyst into the body of the molten trioxane may be achieved by dissolving the catalyst in a solvent, such as benzene, to make up a solution of from about 1 weight to about 50 weight percent of catalyst and then rapidly dispersing the catalyst solution into the body of molten trioxane.

The total amount of catalyst added in the solvent is within the range specified above. A complete description of this procedure may be found in our application Serial No. 691,145, filed concurrently herewith.

Another advantageous procedure involves the polymerization of trioxane in a solution of about 10 to about 70 weight percent in a solvent, such as benzene or cyclohexane. Catalyst is added in the proportion stated above, based on the weight of trioxane in solution. The polymer comes out of solution as it is formed. A complete description of this method of procedure may also be found in our application Serial No. 691,145.

In still another advantageous procedure, the trioxane is suspended in amounts between about 25 and 75 weight percent in an inert liquid such as normal decane which is at least partially a non-solvent therefor. Catalyst in the amount specified above is added and solid polymer is quickly formed in the suspended trioxane. A complete description of this method of procedure may be found in our application Serial No. 691,142, filed concurrently herewith.

The polymer, after formation, is washed clean of monomer, if any, catalyst and solvent or suspension medium if any. When there is no solvent or suspension medium one or more water washes will generally suffice. Where a solvent or supension medium is used, the polymer is generally washed first or with an organic solvent, such as ether, and then finally washed with water. The polymer, even after washing contains traces of boron.

The washed polymer may be compression molded at 180° C. for two minutes, particularly after stabilization with five weight percent of diphenylamine to produce tough, molded objects.

Example 1

One hundred-fifty parts by weight of commercial trioxane (M.P. 60–62° C.) was heated to 90° C. in an open vessel, resulting in a fluid melt. There was then added 0.05 part by weight of boron fluoride etherate. The melt solidified almost immediately as a result of the formation of polyoxymethylene. After cooling to room temperature the mass was broken up into small particles and refluxed with water for one hour. A second hot water wash was carried out for a half hour and the polymer was filtered off. The polymer was dried overnight at 60° C. at atmospheric pressure. The dried polymer had no odor of formaldehyde.

On two parts by weight of polymer, a solution of 0.2 part by weight of diphenylamine in 3.6 parts by weight of diethyl ether was sprayed. The ether was evaporated off the polymer by drying at 90° C. for 30 minutes. A disc was molded from the polymer at 180° C. for two minutes. The disc was tough, strong and translucent.

The stabilized polymer did not decompose when maintained at 105° C. for more than seven days. A molded sheet, five mils in thickness could be creased back and forth along a line one hundred times without cracking.

Other properties of the diphenylamine-stabilized polymer as shown in the table below:

| Property | Value | Units | Test |
|---|---|---|---|
| Flexural strength | 12,000 | p.s.i. | ASTM D790. |
| Flexural modulus | 300,000 | p.s.i. | ASTM D790. |
| Tensile strength | 7,000 | p.s.i. | ASTM D638. |
| Izod impact strength | 1.4–2.1 | foot lbs./in. | ASTM D256. |
| Rockwell Hardness | M73 | | ASTM D785. |
| Deformation, 2,000 p.s.i. @ 122° F. | 1.5 | Percent | ASTM D621. |
| Heat Distortion at 264 p.s.i. | 80 | °C | ASTM D648. |
| Inherent Viscosity | 1.37 | | At 0.5% by weight in chlorophenol containing 2% alpha pinene at 60° C. |

*Example 2*

3373 parts by weight of dried commercial trioxane was heated to 70° C. in an open vessel, resulting in a fluid melt. There was then added 0.34 part by weight of boron trifluoride phenol complex with thorough agitation. Polymerization was not quite as rapid as in the case of boron trifluoride etherate but was essentially complete in 5 minutes. After cooling to room temperature the polymer was purified and molded as above to produce a tough, strong and translucent disc.

*Example 3*

150 parts by weight of commercial trioxane was heated to 70° C. in an open vessel. About 0.1 part by weight of boron trifluoride acetic acid complex was added with thorough agitation. Polymerization was almost instantaneous, and produced a polyoxymethylene product similar to that described above.

It is to be understood that the foregoing detailed description is merely given by way of illustration and that many variations may be made therein without departing from the spirit of our invention.

Having described our invention, what we desire to secure by Letters Patent is:

1. A process for preparing tough, high molecular weight material which comprises polymerizing trioxane in undiluted state under substantially anhydrous conditions in a polymerization zone wherein it is in admixture with a small catalytic amount of a coordinate complex of boron fluoride with an organic compound in which an element of the group consisting of oxygen and sulfur is the donor atom, said coordinate complex being introduced as such into the polymerization zone.

2. A process for preparing tough, high molecular weight material which comprises polymerizing molten trioxane under substantially anhydrous conditions in a polymerization zone for a period not greater than 4 hours in admixture with a small catalytic amount of a coordinate complex of boron fluoride with an organic compound in which oxygen is the donor atom, said coordinate complex being introduced as such into the polymerization zone.

3. A process for preparing tough, high molecular weight material which comprises polymerizing molten trioxane under substantially anhydrous conditions in a polymerization zone for a period not greater than 4 hours in admixture with a small catalytic amount of a coordinate complex of boron fluoride with an organic compound in which oxygen is the donor atom, said complex having a boron fluoride content of from about .001 to about 1.0 weight percent based on the weight of trioxane said coordinate complex being introduced as such into the polymerization zone.

4. A process for preparing tough, high molecular weight material which comprises polymerizing trioxane in undiluted state under substantially anhydrous conditions in a polymerization zone at a temperature between about −10 and about 180° C. in admixture with a small catalytic amount of a coordinate complex of boron fluoride with an organic compound in which oxygen is the donor atom said coordinate complex being introduced as such into the polymerization zone.

5. A process for preparing tough, high molecular weight material which comprises polymerizing trioxane in undiluted state under substantially anhydrous conditions in a polymerization zone between about −10 and about 180° C. for a period not greater than 4 hours in admixture with a coordinate complex of boron fluoride with an organic compound in which oxygen is the donor atom, said complex having a boron fluoride content of from about .001 to about 1.0 weight percent based on the weight of trioxane said coordinate complex being introduced as such into the polymerization zone.

6. A process for preparing tough, high molecular weight material which comprises polymerizing trioxane in undiluted state under substantially anhydrous conditions at a temperature between about −10 and about 180° C. for a period not greater than 4 hours in admixture with a small catalytic amount of boron fluoride etherate.

7. The process of claim 6 in which said boron fluoride etherate is present in an amount such that its boron fluoride content is between about .001 and about 1.0 weight percent of the trioxane.

8. A process for preparing tough, high molecular weight material which comprises polymerizing trioxane in undiluted state under substantially anhydrous conditions at a temperature between about −10 and 180° C. for a period not greater than 4 hours in admixture with a small catalytic amount of boron fluoride phenol complex.

9. The process of claim 8 in which said boron fluoride content is between about .001 and about 1.0 weight percent of the trioxane.

10. A process for preparing tough, high molecular weight material which comprises polymerizing trioxane in undiluted state under substantially anhydrous conditions at a temperature between about −10 and about 180° C. for a period not greater than 4 hours in admixture with a small catalytic amount of boron fluoride acetic acid complex.

11. The process of claim 10 in which said boron fluoride acetic acid is present in an amount such that its boron fluoride content is between about .001 and about 1.0 weight percent of the trioxane.

12. A process of preparing tough, high molecular weight material which comprises polymerizing molten trioxane under substantially anhydrous conditions in admixture with a small catalytic amount of boron fluoride etherate.

13. The process of claim 5 in which said organic compound is an ether.

14. A process for preparing tough, high molecular weight material which comprises polymerizing molten trioxane under substantially anhydrous conditions in a polymerization zone wherein it is in admixture with a small catalytic amount of a coordinate complex of boron fluoride with an organic compound of the group consisting of alcohols, phenols, acids, ethers, acid anhydrides, esters, ketones, aldehydes, dialkyl sulfides and mercaptans, said coordinate complex being introduced as such into the polymerization zone.

15. A process for preparing tough, high molecular weight material which comprises polymerizing trioxane in undiluted state under substantially anhydrous conditions in a polymerization zone at a temperature between about −10 and about 180° C. for a period not greater than 4 hours in the presence of a coordinate complex of boron fluoride with an organic compound of the group consisting of alcohols, phenols, acids, ethers, acid anhydrides, esters, ketones, aldehydes, dialkyl sulfides and mercaptans, said complex having a boron fluoride content of from about .001 to about 1.0 weight percent based on the weight of trioxane and being introduced as such into the polymerization zone.

16. A process of preparing tough, high molecular weight material which comprises polymerizing solid trioxane under substantially anhydrous conditions in admixture with a small catalytic amount of a coordinate complex of boron fluoride with an organic compound in which an element of the group consisting of oxygen and sulfur is the donor atom, said coordinate complex being introduced as such into the polymerization zone.

References Cited in the file of this patent

UNITED STATES PATENTS

| | | |
|---|---|---|
| 2,142,980 | Huijser et al. | Jan. 3, 1939 |
| 2,270,135 | Mikeska et al. | Jan. 13, 1942 |
| 2,768,994 | MacDonald | Oct. 30, 1956 |
| 2,795,571 | Schneider | June 11, 1957 |

OTHER REFERENCES

Walker: "Formaldehyde," ACS, Monograph #120 (1953), pages 114 and 146–153.